Patented Aug. 23, 1932

1,873,942

UNITED STATES PATENT OFFICE

ADOLF WINDAUS, OF GOTTINGEN, GERMANY

ANTIRACHITIC PREPARATIONS AND PROCESS FOR MAKING SAME

No Drawing. Application filed November 28, 1927, Serial No. 236,385, and in Germany January 14, 1927.

The present invention relates to a new compound having a high anti-rachitic efficacy and to a process of preparing the same, and this application is a continuation in part of my copending application for Letters Patent of the United States for process for the manufacture of anti-rachitic preparations filed March 3, 1927, Serial No. 172,563. It is known that efficacy against rickets can be imparted to cholesterine or phytosterine by exposing them to ultra-violet radiations.

According to this invention ergosterol, which is a high molecular crystallized alcohol containing several double bonds and deriving its name from its occurrence in ergot (Zeitschr. f. Physiolog. Chemie, 124, 1923, page 8) is converted when exposed to the radiations of ultra-violet rays, into a new compound having a high anti-rachitic efficacy.

My process is preferably carried out by subjecting a solution of ergosterol in alcohols, such as ethyl alcohol, in benzene, in gasoline, in oils, or in similar solvents, to the action of active rays as, for example, ultraviolet rays artificially produced by a mercury vapor lamp. The exposure to the rays may be effected in several ways. For example, a good result is obtainable when dipping the cooled ultra-violet lamp into the solution. It is essential to exclude oxygen when carrying out the process, since the reaction product eagerly absorbs oxygen, especially when irradiated, thereby losing its anti-rachitic activity. Instead of exposing pure ergosterol to the radiations, extracts which contain enriched ergosterine for example yeast fat, can be employed with advantage.

In comparison with ergosterol my new product is easily soluble in alcohol or oils. Its anti-rachitic efficacy is extremely strong. My new product is superior in efficacy to all hitherto known anti-rachitic agents, for instance, it is more than a thousand times as efficacious as cholesterine which has been exposed to ultra-violet radiations. For example, an average daily dose for rachitic children is 2–4 mg., and even less. It is not precipitated by a solution of digitonin as ergosterol. Furthermore, its spectrum of the ultra-violet region is different from that of ergosterol. Its alcoholic solution shows in a polarized light a slight dextrorotation while the solutions of ergosterol have a levorotation.

The following example is intended to illustrate my invention, without, however, limiting it thereto.

A solution of 100 g. ergosterol in 50 liters of ethyl alcohol is subjected to the action of the ultra-violet rays of a quartz mercury vapor lamp which is dipped under cooling into the solution while conducting a continuous stream of nitrogen through the reaction vessel in order to exclude oxygen. The reaction is controlled by treating, from time to time, a sample with a solution of 1% digitonin. The reaction is interrupted when not more than a small precipitate of the starting material is yielded. Care has to be taken that the radiation is not continued too long, as otherwise the resulting vitamin can be destroyed.

The alcoholic solution is then evaporated in vacuo to about 1½ liters, and cooled, whereby about 10% unchanged ergosterol crystallizes out, and after having filtered off the starting material the solution is completely evaporated in vacuo. The use of a vacuum may be dispensed with.

The necessary daily healing dose for rickets of rats is 1/10,000 to 1/25,000 mg. and less, usually given during the time of about two to three weeks.

Claims:

1. The process which comprises dissolving previously isolated ergosterol, substantially free of materials which are normally associated with it in nature, in a chemically and photochemically inert organic ergosterol solvent, and exposing said solution to light having an activating action until a sample treated with a solution of 1% digitonin yields only a small precipitate.

2. The process which comprises dissolving previously isolated ergosterol, substantially free of materials which are normally associated with it in nature, in a chemically and photochemically inert aliphatic oxygen-containing organic ergosterol solvent, and exposing said solution to light having an activating action until a sample treated with a solution of 1% digitonin yields only a small precipitate.

3. As a new article of manufacture, the product obtained by subjecting ergosterol substantial free of materials which are normally associated with it in nature to activation by means of ultra-violet light rays, said product being a resinous oil distinguished by being more soluble in alcohol than ergosterol, by showing in polarized light a slight dextrorotation, and by having a degree of anti-rachitic efficacy more than one thousand times that of cholesterine which has been activated by ultra-violet light rays to its maximum anti-rachitic efficacy.

4. The process which comprises exposing a solution of ergosterol substantially free of materials which are normally associated with it in nature in ethyl alcohol to light having an activating action until a sample treated with a solution of 1% digitonin yields only a small precipitate.

5. The process which consists in subjecting a solution of ergosterol substantially free of materials which are normally associated with it in nature in ethyl alcohol to the action of ultra-violet rays produced by a quartz mercury vapor lamp dipped under cooling into the solution until a sample treated with a solution of 1% digitonin yields only a small precipitate, strongly evaporating then the alcoholic solution, separating the unchanged ergosterol by cooling the concentrated alcoholic solution and evaporating the filtrate completely.

6. The process which consists in subjecting a solution of ergosterol substantially free of materials which are normally associated with it in nature in ethyl alcohol, while excluding oxygen, to the action of ultra-violet rays produced by a quartz mercury vapor lamp dipped into the solution until a sample treated with a solution of 1% digitonin yields only a small precipitate, strongly evaporating then the alcoholic solution, separating the unchanged ergosterol by cooling the concentrated alcoholic solution and evaporating the filtrate completely.

7. The process which consists in subjecting a solution of ergosterol substantially free of materials which are normally associated with it in nature in ethyl alcohol to the action of ultra-violet rays produced by a quartz mercury vapor lamp dipped under cooling into the solution until a sample treated with a solution of 1% digitonin yields only a small precipitate, strongly evaporating then the alcoholic solution in a vacuo, separating the unchanged ergosterol by cooling the concentrated alcoholic solution and evaporating the filtrate completely in a vacuo.

8. The process which consists in subjecting a solution of ergosterol substantially free of materials which are normally associated with it in nature in ethyl alcohol, while excluding oxygen, to the action of ultra-violet rays produced by a quartz mercury vapor lamp dipped into the solution until a sample treated with a solution of 1% digitonin yields only a small precipitate, strongly evaporating then the alcoholic solution in a vacuo, separating the unchanged ergosterol by cooling the concentrated alcoholic solution and evaporating the filtrate completely in a vacuo.

In testimony whereof I have hereunto signed my name.

ADOLF WINDAUS.